(12) United States Patent  
Chou et al.

(10) Patent No.: US 8,432,699 B2  
(45) Date of Patent: Apr. 30, 2013

(54) JUNCTION BOX AND ELECTRICAL CONNECTION MECHANISM THEREOF

(75) Inventors: Yen-Chi Chou, Taoyuan Hsien (TW); Chen-Yu Yu, Taoyuan Hsien (TW); Chin-Chu Huang, Taoyuan Hsien (TW); Chih-Jen Chen, Taoyuan Hsien (TW); Ren-De Huang, Taoyuan Hsien (TW); Yung-Yu Chang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 351 days.

(21) Appl. No.: 13/019,098

(22) Filed: Feb. 1, 2011

(65) Prior Publication Data  
US 2012/0069505 A1 Mar. 22, 2012

Related U.S. Application Data

(60) Provisional application No. 61/383,812, filed on Sep. 17, 2010.

(51) Int. Cl.  
*H05K 7/00* (2006.01)

(52) U.S. Cl.  
USPC ............... 361/730; 361/679.01; 439/76.1; 136/243; 136/244

(58) Field of Classification Search ............... 361/730  
See application file for complete search history.

(56) References Cited

U.S. PATENT DOCUMENTS 8,197,263 B2 * 6/2012 Rueggen et al. ............ 439/76.1  
2011/0195585 A1 * 8/2011 Feldmeier et al. ........... 439/110

* cited by examiner

*Primary Examiner* — Anthony Q Edwards  
(74) *Attorney, Agent, or Firm* — Kirton McConkie; Evan R. Witt

(57) ABSTRACT

A junction box for a solar module is disclosed and comprises a housing having an opening for introducing a plurality of conductor strips; and an electrical connection mechanism disposed in a receptacle of the housing. The electrical connection mechanism comprises a plurality of conductor strip connection devices disposed on an inner surface of the housing for connecting to the conductor strips; and a current-path arrangement module detachably connected with the conductor strip connection devices and comprising a carrier, a plurality of electricity conveying elements and a plurality of electronic components, wherein the electricity conveying elements and the electronic components are disposed on one surface of the carrier, and each electronic component is connected with two adjacent electricity conveying elements.

20 Claims, 14 Drawing Sheets

JUNCTION BOX AND ELECTRICAL CONNECTION MECHANISM THEREOF

CROSS-REFERENCE TO RELATED APPLICATIONS

This application claims the benefit of prior U.S. provisional application 61/383,812, which is entitled "CONNECTION OR JUNCTION BOX" and filed on Sep. 17, 2010. The entire disclosures of the above-captioned application are incorporated herein by reference.

FIELD OF THE INVENTION

The present invention relates to a junction box, and more particularly to a junction box for solar or photovoltaic modules.

BACKGROUND OF THE INVENTION

There are several advantages of photovoltaic solar power that make it one of the most promising renewable energy sources in the world. The photovoltaic solar power is free, needs no fuel and produces no waste or pollution, and the solar power generator requires little maintenance and no supervision and has a life of 20-30 years with low running costs. Solar power generators are simply distributed to homes, schools, or businesses, where their assemblies require no extra development or land area and their functions are safe and quiet. Remote areas can easily produce their own supply of electricity by constructing as small or as large of a system as needed.

Generally, the solar or photovoltaic module for generating electric energy from sunlight comprises a plurality of solar or photovoltaic cells. The solar cells in a solar module are usually connected to each other by thin conductor strips (i.e. conductor ribbons). These thin conductor strips are routed out of the solar module on the side facing away from the sun. The thin conductor strips are mostly made of copper foils and protruded from the rear side of the solar module (i.e. solar panel). These flexible and thin conductor strips are very sensitive and difficult to contact. Therefore, one or more junction boxes are employed for the solar module and thin conductor strips are manually contacted with electrical terminal receptacles of the junction box. In addition, the junction box is an integral part of a solar or photovoltaic system and it provides electrical connections between the solar cells of the individual solar module (i.e. solar panel) and between the solar modules and other components of the system (i.e. DC/AC inverter). Generally, the junction box is disposed on a rear surface of the solar panel and has electrical connection mechanism in the interior for contacting the thin conductor strips of the solar modules and conducting the electrical current generated by the solar modules to the outside. Without a junction box, the solar modules could not work properly.

Generally, plural solar modules are operated in series connection, wherein a so called bypass diode is anti-parallel connected to each solar module. The bypass diode is disposed inside the junction box and fastened and connected to the electrical connection mechanism of the junction box. In a case of a solar module is shaded or does not produce electricity because of defect, this solar module would lower the power of the solar modules in series connection or even suffers damage without bypass diode. This is because that if a solar cell within a solar cell group of the solar module is partially shaded, this shaded solar cell acts as a blocking diode or resistor within the circuit of the solar cell group, which may result in a damage of the shaded solar cell and result in the entire solar cell group of the solar module no longer being able to supply electric energy. The above-mentioned situations can be avoided by using the bypass diode of the junction box, because the current flows through the diode and is sustained. In other words, the bypass diodes are electrically connected in an anti-parallel manner with respect to the solar cell groups and have the effect that the current flow through the solar module is led past solar cell groups that only supply low power, i.e. the terminals of this solar cell group of a solar module are short-circuited by the bypass diode and the corresponding cell group is bypassed thereby. Thus, such a solar cell group does no longer contribute to the overall performance of the solar module, but the overall current flow through the solar panel is substantially unobstructed and a damage of individual solar cell is avoided.

It is obviously that due to the mechanical conditions particularly the form of the thin conductor strips and the bypass diodes, a number of difficulties occur when constructing the junction box. In addition, due to the manual connecting, the assembly and installation of the thin conductor strips and the bypass diodes with the electrical connection mechanism inside the junction box is cost and laborious. Furthermore, when one of the bypass diodes is breakdown, it is difficult to check which one is failed and laborious to replace the failed bypass diode with a new one. Up to now, the conventional junction box is complex in construction and installing the junction box is laborious. In addition, the conventional junction box doesn't provide reliable electrical connections and the durability of the junction box is low. It is therefore desirable to provide a junction box that is simple in structure, cost-effective, durable enough to withstand a wide range of environment conditions and easily be installed and maintained, while maintaining a high-quality, reliable electrical connections between the components of a solar or photovoltaic system.

SUMMARY OF THE INVENTION

It is an object of the present invention to provide a junction box having an electrical connection mechanism with a current-path arrangement module, which is capable of assembling, fastening and replacing the bypass diodes easily.

It is another object of the present invention to provide a junction box for solar modules, which is simple in construction, cost-effective, durable enough to withstand a wide range of environment conditions and easily be assembled, installed and maintained.

It is still an object of the present invention to provide a junction box for solar modules, which can maintain a high-quality, reliable electrical connections between the components of a solar or photovoltaic system.

In accordance with one aspect of the present invention, a junction box comprises a housing having an opening for introducing a plurality of conductor strips; and an electrical connection mechanism disposed in a receptacle of the housing. The electrical connection mechanism comprises a plurality of conductor strip connection devices disposed on an inner surface of the housing for connecting to the conductor strips; and a current-path arrangement module detachably connected with the conductor strip connection devices and comprising a carrier, a plurality of electricity conveying elements and a plurality of electronic components, wherein the electricity conveying elements and the electronic components are disposed on one surface of the carrier, and each electronic component is connected with two adjacent electricity conveying elements.

In accordance with another aspect of the present invention, an electrical connection mechanism for a junction box of a solar module comprises a plurality of conductor strip connection devices for structurally and electrically connecting to a plurality of conductor strips of the solar module; and a current-path arrangement module detachably connected with the conductor strip connection devices and comprising a carrier, a plurality of electricity conveying elements and a plurality of electronic components, wherein the electricity conveying elements and the electronic components are disposed on one surface of the carrier, the electricity conveying elements are connected with the conductor strip connection devices respectively, and the electronic components are connected with the electricity conveying elements.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
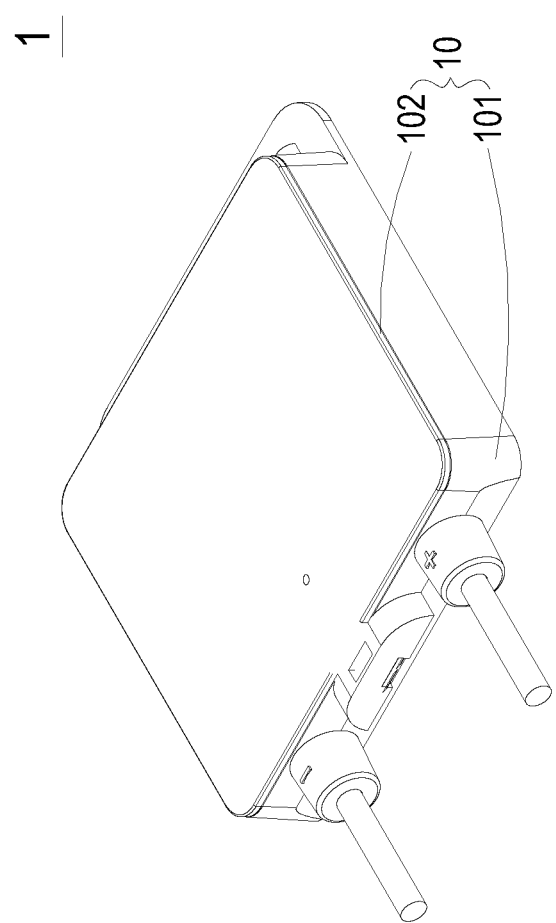
FIG. 1 is a schematic view showing a junction box for solar modules according to a preferred embodiment of the present invention.

Please refer to FIG. 1, which is a schematic view showing a junction box for solar modules according to a preferred embodiment of the present invention. The junction box 1 of the present invention includes a housing 10 made of durable plastic that can stand the external weather influences for at least 20 years and has electrical insulation properties. The housing 10 includes a base 101 and a cover 102, which is detachably fastened to or engaged with the base 101. The housing 10 has at least one opening formed on the bottom of the base 101 for introducing the conductor strips of the solar modules into the interior of the housing 10. The housing 10 of the junction box 1 can be fixed or attached to the rear surface of the solar module (not shown in FIG. 1).

Figure 2:
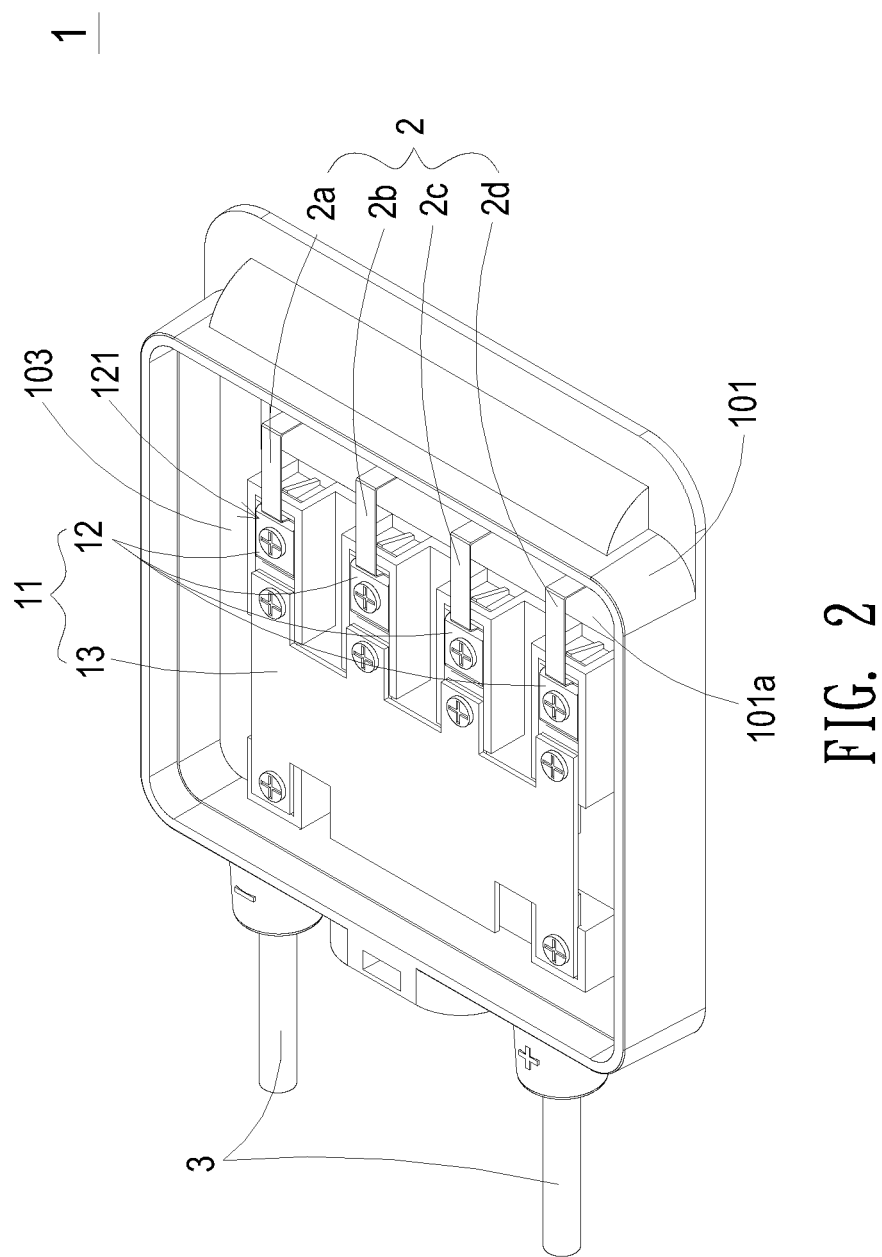
FIG. 2 is a schematic view showing an electrical connection mechanism of the junction box of FIG. 1.

FIG. 2 is a schematic view showing an electrical connection mechanism of the junction box of FIG. 1. As shown in FIG. 2, the junction box 1 includes an electrical connection mechanism 11 disposed in a receptacle 103 of the base 101 and configured to connect with the conductor strips 2 of the solar modules through the opening 101a of the base 101 and two electrical cables 3. The electrical connection mechanism 11 includes a plurality of conductor strip connection devices 12 and a current-path arrangement module 13 (i.e. an intermediate connection arrangement), which is detachably connected with the conductor strip connection devices 12 and the electrical cables 3. The conductor strip connection devices 12 are disposed and mounted on an inner surface of the base 101 and configured to contact and connect with the conductor strips 2 of the solar modules, for example four flat and thin conductor strips 2a, 2b, 2c, 2d. Each of the conductor strip connection devices 12 includes a terminal connection part 121 for structural and electrical connection to a corresponding conductor strip 2a-2d. Preferably, the conductor strip connection devices 12 are secured, fastened or attached to the bottom surface of the base 101 by engaging, screwing, embedding, insertion molding, locking or adhesive, and it is not limited thereto.

Figure 3A:
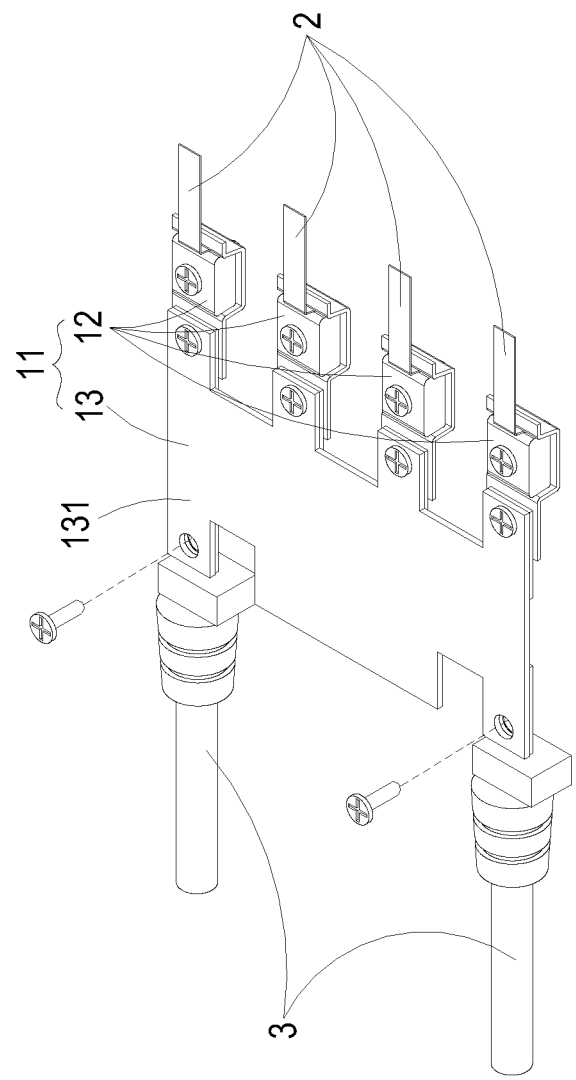
FIGS. 3A and 3B are the front and rear views showing the current-path arrangement module of the electrical connection mechanism of FIG. 2, respectively.
Figure 3B:
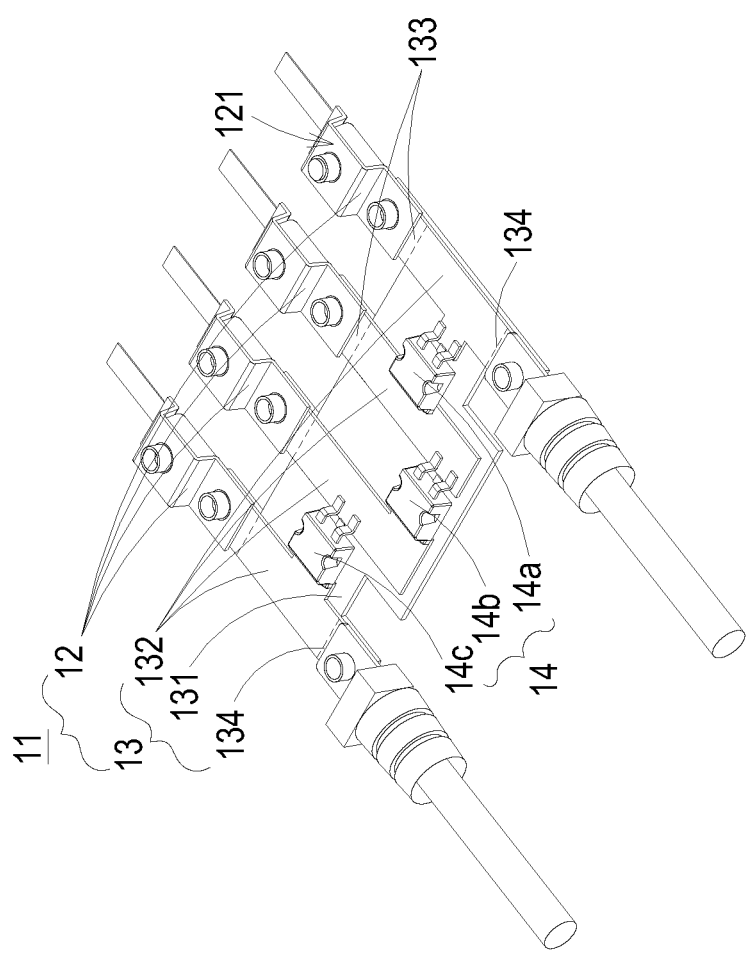

FIGS. 3A and 3B are the front and rear views showing the current-path arrangement module of the electrical connection mechanism of FIG. 2, respectively. The current-path arrangement module 13 is detachably connected with the conductor strip connection devices 12 and the electrical cables 3 and includes a carrier 131, a plurality of electricity conveying elements 132 and a plurality of electronic components 14. The electricity conveying elements 132 are separately disposed on one surface of the carrier 131 to form a plurality of electricity conveying paths. The electronic components 14 are disposed on the carrier 131, and each electronic component 14 is connected to two adjacent electricity conveying elements 132 so as to form a current-path arrangement as required. In an embodiment, the carrier 131 is a printed circuit board or wiring board, the electricity conveying elements 132 are electrical conductive traces disposed on one surface of the carrier 131, and the electronic components 14 are bypass diodes. More preferably, there are four electricity conveying elements 132 and three bypass diodes 14a, 14b, 14c mounted on the rear surface of the carrier 131. The electricity conveying element 132 includes a first connection pad 133 disposed on a first side edge of the carrier 131 and a second connection pad 134 disposed on a second side edge of the carrier 131 opposite to the first side edge. The first connection pads 133 of the electricity conveying element 132 are coupled and connected with the terminal connection parts 121 of the conductor strip connection devices 12 by fastening elements, for example screws or clamping devices made of resilient and conductive material, but it is not limited thereto. Two of the second connection pads 134 of the electricity conveying element 132 are coupled and connected with the contact portions of the electrical cables 3 by fastening members, for example screws or clamping devices made of resilient and conductive material, but it is not limited thereto. By using the current-path arrangement module 13, the bypass diodes 14a, 14b, 14c can be replaced and maintained easily by replacing the current-path arrangement module 13 with another one when one or more bypass diodes 14a, 14b, 14c is breakdown or failed.

Figure 4A:
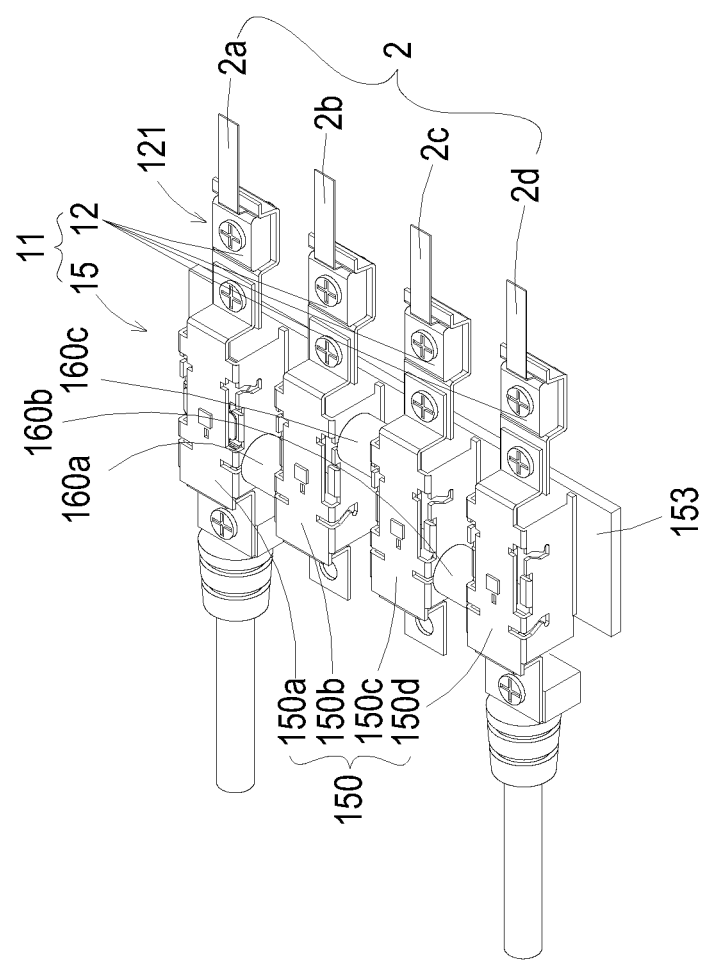
FIGS. 4A and 4B are the front and rear views showing an electrical connection mechanism with another current-path arrangement module according to the present invention.
Figure 4B:
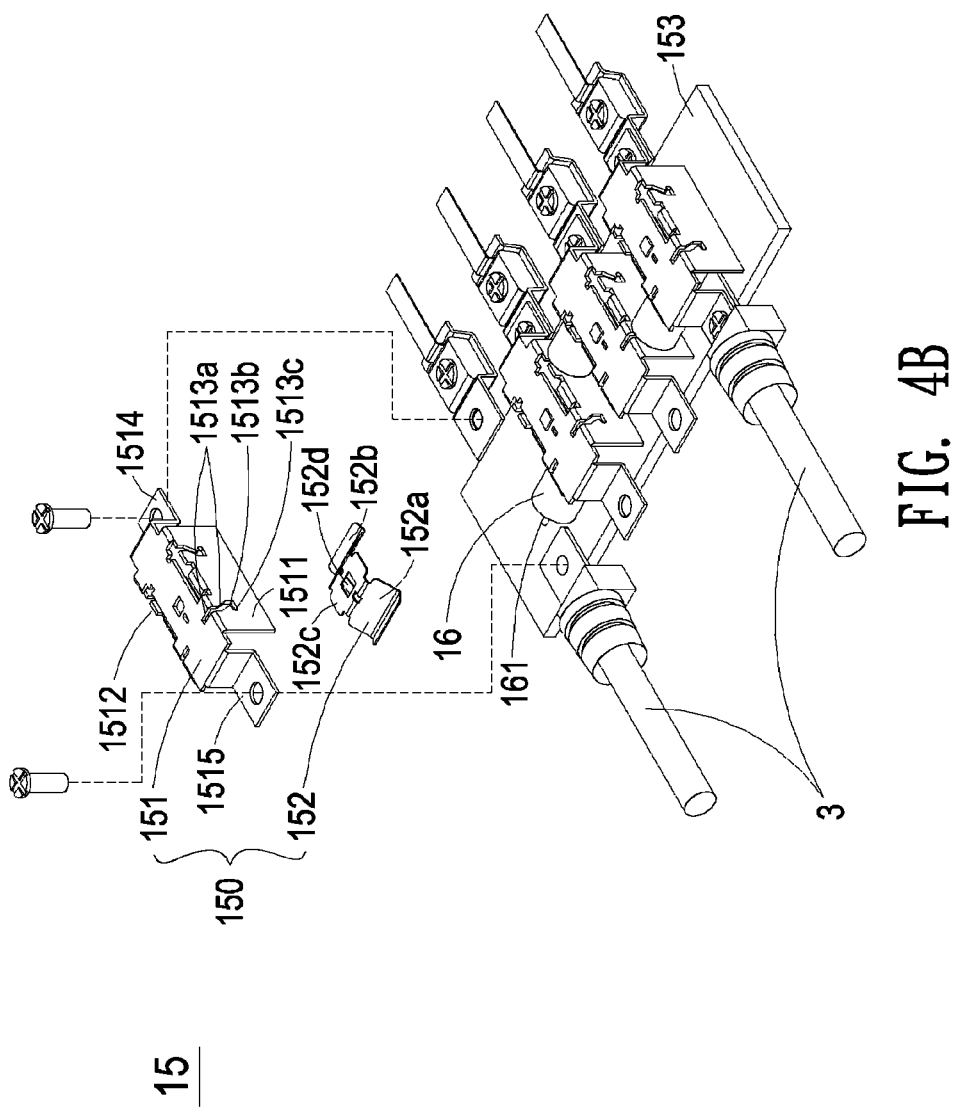

FIGS. 4A and 4B are the front and rear views showing an electrical connection mechanism with another current-path arrangement module according to the present invention. As shown in FIGS. 1, 4A and 4B, the electrical connection mechanism 11 includes a plurality of conductor strip connection devices 12 and a current-path arrangement module 15 (i.e. an intermediate connection arrangement), which is detachably connected with the conductor strip connection devices 12. The conductor strip connection devices 12 are disposed on an inner surface of the base 101 and configured to contact and connect with the conductor strips 2 of the solar modules, for example four flat and thin conductor strips 2a, 2b, 2c, 2d. Each of the conductor strip connection devices 12 includes a terminal connection part 121 for structurally and electrically connecting to a corresponding conductor strip 2a-2d. Preferably, the conductor strip connection devices 12 are secured, fastened or attached to the bottom surface of the base 101 by engaging, screwing, embedding, insertion molding, locking or adhesive, and it is not limited thereto.

The current-path arrangement module 15 is detachably connected with the conductor strip connection devices 12 and the electrical cables 3 and includes a plurality of electricity conveying elements 150, a plurality of electronic components 16 and a carrier 153. The electricity conveying elements 150 are separately disposed on one surface of the carrier 153 to form a plurality of electricity conveying paths. The electronic components 16 are disposed on the carrier 153, and each electronic component 16 is connected to two adjacent electricity conveying elements 150 so as to form a current-path arrangement as required. In an embodiment, the carrier 153 is a supporting plate for supporting and mounting the electricity conveying elements 150 and the electronic components 16 thereon, the electricity conveying elements 150 are electrical conductive rails disposed on one surface of the carrier 153, and the electronic components 16 are bypass diodes. More preferably, there are four electrical conductive rails 150a, 150b, 150c, 150d and three bypass diodes 16a, 16b, 16c mounted on one surface of the carrier 153. In an embodiment, each bypass diode 16a, 16b, 16c has two terminals connected and fastened to two adjacent electrical conductive rails 150a, 150b, 150c, 150d of the current-path arrangement module 15. The electrical conductive rails 150a, 150b, 150c, 150d can be mounted on one surface of the carrier 153 by rails, embedding, engaging, locking or adhesive, and it is not limited thereto. The carrier 153 can be mounted on the bottom surface in the interior 103 of the base 101 of the housing 10 by screwing, locking or engaging, and it is not limited thereto. By using the current-path arrangement module 15, the bypass diodes 16a, 16b, 16c can be replaced and maintained easily by replacing the current-path arrangement module 15 with another one when one or more bypass diodes 16a, 16b, 16c is breakdown or failed.

Figure 4C:
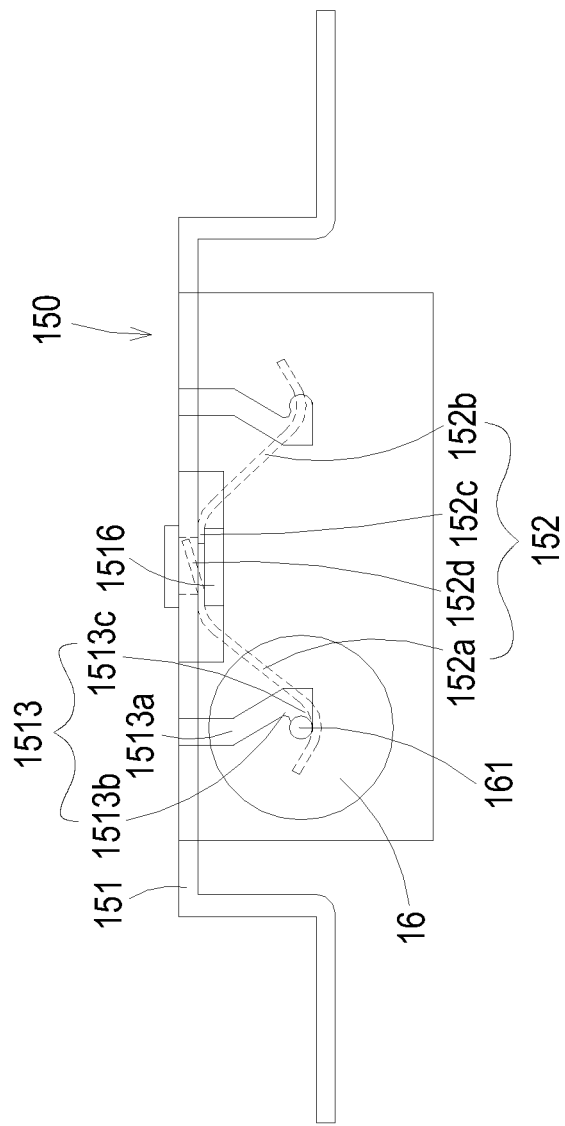
FIG. 4C is a schematic view showing the assembly of the electronic components and the electricity conveying elements of FIGS. 4A and 4B.

FIG. 4C is a schematic view showing the assembly of the electronic components and the electricity conveying elements of FIGS. 4A and 4B. As shown in FIGS. 4A, 4B and 4C, each of the electricity conveying elements 150 includes a main body 151 and a resilient member 152. The main body 151 has a first sidewall 1511 and a second sidewall 1512 opposite to the first sidewall 1511. Each of the sidewalls 1511, 1512 has at least one sliding slot 1513. The sliding slot 1513 includes plural guiding segments 1513a, a curve segment 1513b and a bottom segment 1513c (i.e. position segment). The resilient member 152 has two arms 152a, 152b and a connection portion 152c. At least one engaging element 152d is extended outwardly from the connection portion 152c and secured to a corresponding engaging element 1516 in the inner surface of the main body 151 of the electricity conveying element 150 so that the resilient member 152 is disposed in the interior of the electricity conveying element 150 and the two arms 152a, 152b are disposed adjacent to the sliding slots 1513 of the main body 151. The main body 151 of the electricity conveying element 150 further includes a first connection pad 1514 and a second connection pad 1515. The first connection pad 1514 of the electricity conveying element 150 is connected and fastened with the terminal connection part 121 by fastening element, for example screw or clamping devices made of resilient and conductive material, and it is not limited thereto. The second connection pad 1515 of the electricity conveying element 150 is connected and fastened with a corresponding electrical cable 3 by fastening element, for example screw or clamping devices made of resilient and conductive material, and it is not limited thereto.

When one terminal 161 of the electronic component 16 (i.e. bypass diode 16) is inserted into a corresponding sliding slot 1513 of the main body 151 of the electricity conveying element 150 and guided by the guiding segments 1513a, the terminal 161 of the bypass diode 16 will urge against the arm 152a or 152b of the resilient member 152 during the sliding motion. When the terminal 161 of the bypass diode 16 is pressed and guided toward the bottom segment 1513c of the sliding slot 1513 and goes across the curve segment 1513b, the terminal 161 of the bypass diode 16 can be positioned in the bottom segment 1513c of the sliding slot 1513 due to the resilient recovery force and the suppressing force exerted by the resilient member 152. Namely, the terminal 161 of the bypass diode 16 can be positioned in the sliding slot 1513 by clipping or clamping method. By employing the electricity conveying element 150 as shown in FIGS. 4A and 4B, the bypass diodes 16 can be installed or replaced easily when installation or when one or more bypass diodes 16 is breakdown or failed.

Figure 5A:
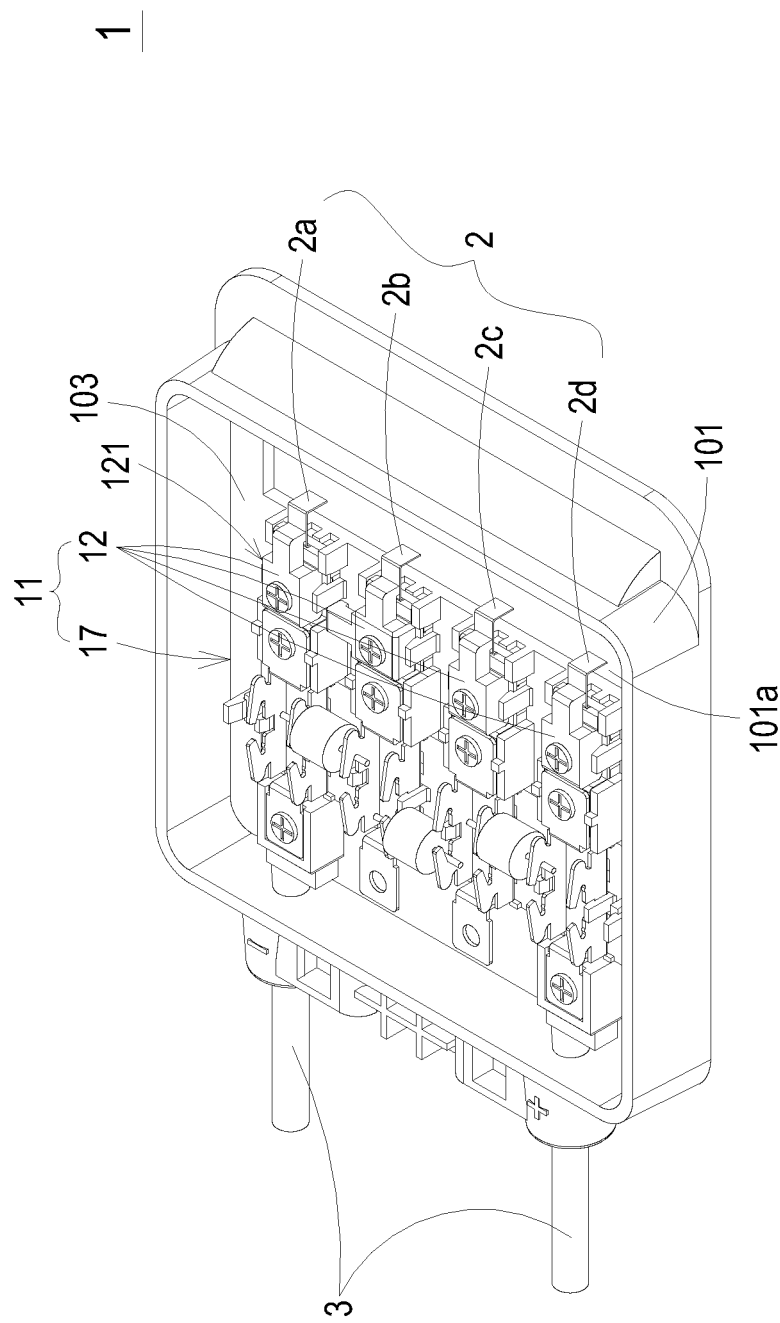
FIG. 5A is a schematic view showing another electrical connection mechanism of the junction box of FIG. 1.
Figure 5B:
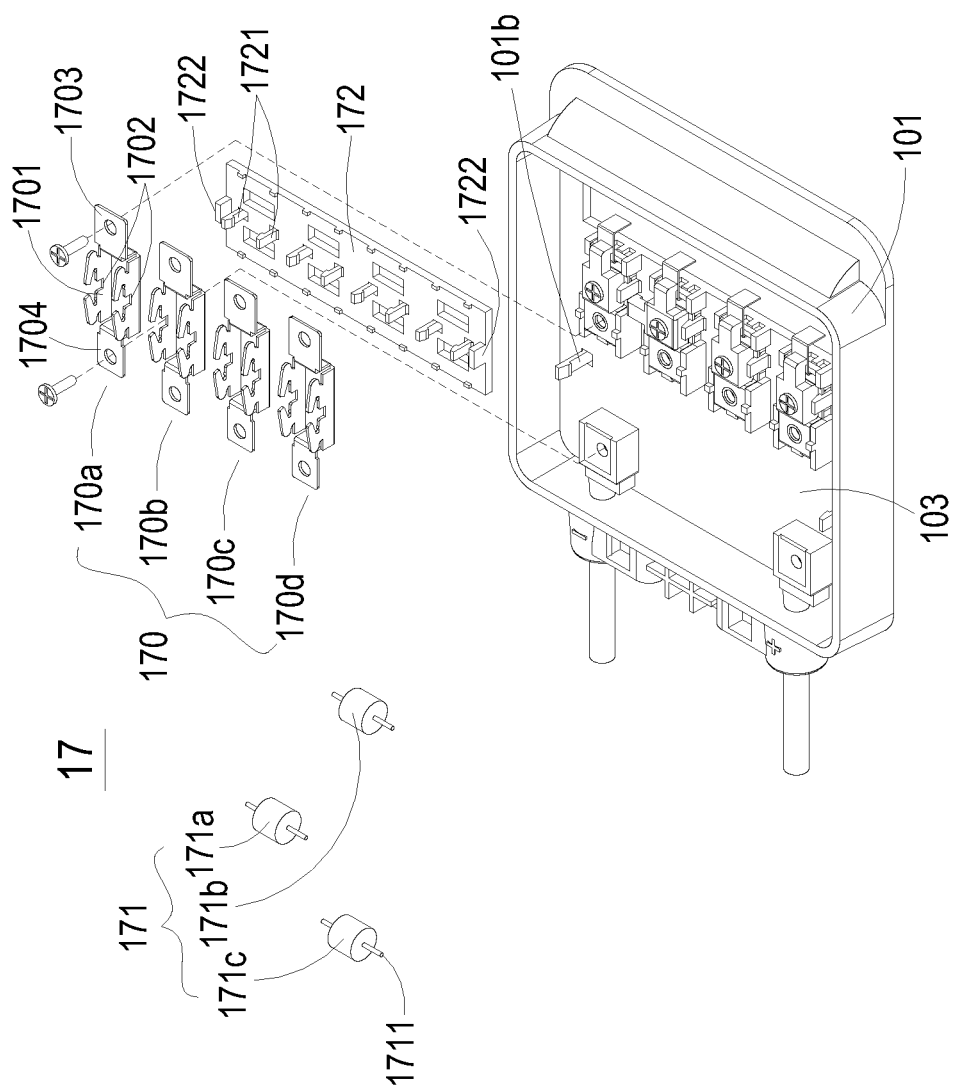
FIG. 5B is a schematic view showing the current-path arrangement module of the electrical connection mechanism of FIG. 5A.

FIG. 5A is a schematic view showing another electrical connection mechanism of the junction box of FIG. 1; and FIG. 5B is a schematic view showing the current-path arrangement module of the electrical connection mechanism of FIG. 5A. As shown in FIGS. 5A and 5B, the junction box 1 includes an electrical connection mechanism 11 disposed in a receptacle 103 of the base 101 and configured to connect with the conductor strips 2 of the solar modules through the opening 101a of the base 101 and two electrical cables 3. The electrical connection mechanism 11 includes a plurality of conductor strip connection devices 12 and a current-path arrangement module 17, which is detachably connected with the conductor strip connection devices 12 and the electrical cables 3. The conductor strip connection devices 12 are disposed and mounted on an inner surface of the base 101 and configured to contact and connect with the conductor strips 2 of the solar modules, for example four flat and thin conductor strips 2a, 2b, 2c, 2d. Each of the conductor strip connection devices 12 includes a terminal connection part 121 for structural and electrical connection to a corresponding conductor strip 2a-2d. Preferably, the conductor strip connection devices 12 are secured, fastened or attached to the bottom surface of the base 101 by engaging, screwing, embedding, insertion molding, locking or adhesive, and it is not limited thereto.

The current-path arrangement module 17 is detachably connected with the conductor strip connection devices 12 and the electrical cables 3 and includes a plurality of electricity conveying elements 170, a plurality of electronic components 171 and a carrier 172. The electricity conveying elements 170 are separately disposed on one surface of the carrier 172 to form a plurality of electricity conveying paths. The electronic components 171 are disposed on the carrier 172, and each electronic component 171 is connected to two adjacent electricity conveying elements 170 so as to form a current-path arrangement as required. In an embodiment, the carrier 172 is a supporting plate for supporting and mounting the electricity conveying elements 170 and the electronic components 171 thereon, the electricity conveying elements 170 are electrical conductive rails disposed on one surface of the carrier 172, and the electronic components 171 are bypass diodes. More preferably, there are four electrical conductive rails 170a, 170b, 170c, 170d and three bypass diodes 171a, 171b, 171c mounted on one surface of the carrier 172. In an embodiment, each bypass diode 171a, 171b, 171c has two terminals connected to two adjacent electrical conductive rails 170a, 170b, 170c, 170d of the current-path arrangement module 17. The electrical conductive rails 170a, 170b, 170c, 170d can be mounted on one surface of the carrier 172 by rails, embedding, engaging, locking or adhesive, and it is not limited thereto. The carrier 172 can be mounted on the bottom surface in the receptacle 103 of the base 101 of the housing 10 by screwing, locking or engaging, and it is not limited thereto. By using the current-path arrangement module 17, the bypass diodes 171a, 171b, 171c can be replaced and maintained easily by replacing the current-path arrangement module 17 with another one when one or more bypass diodes 171a, 171b, 171c is breakdown or failed.

In an embodiment, each of the electricity conveying elements 170 includes a main body 1701. The main body 1701 has at least one engaging element 1702. The carrier 172 has a plurality of engaging elements 1721 for engaging with the engaging elements 1702 of the electricity conveying elements 170. Preferably, the engaging elements 1721 of the carrier 172 are hooks and the engaging elements 1702 of the electricity conveying elements 170 are engaging slots, and it is not limited thereto. The carrier 172 can be secured on the bottom surface of the receptacle 103 of the base 101. The carrier 172 further includes one or more securing element 1722 and the base 101 includes one or more securing element 101b for fastening with the securing element 1722 of the carrier 172 so that the carrier 172 can be secured on the bottom surface of the receptacle 103 of the base 101. The main body 1701 of the electricity conveying element 170 further includes a first connection pad 1703 and a second connection pad 1704. The first connection pad 1703 of the electricity conveying element 170 is connected and fastened with the terminal connection part 121 by fastening element, for example screw or clamping devices made of resilient and conductive material, and it is not limited thereto. The second connection pad 1704 of the electricity conveying element 170 is connected and fastened with a corresponding electrical cable 3 by fastening element, for example screw or clamping devices made of resilient and conductive material, and it is not limited thereto.

Figure 5C:
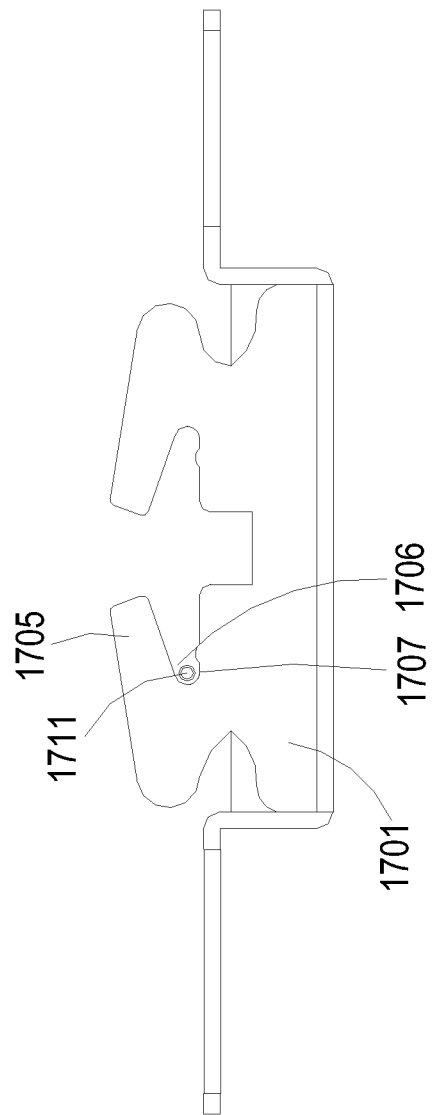
FIG. 5C is a schematic view showing the assembly of the electronic components and the electricity conveying elements of FIGS. 5A and 5B.

FIG. 5C is a schematic view showing the assembly of the electronic components and the electricity conveying elements of FIGS. 5A and 5B. As shown in FIGS. 5A, 5B and 5C, the main body 1701 of the electricity conveying element 170 further includes a plurality of extending arms 1705 and a plurality of receiving slots 1706. Each of the receiving slots 1706 includes a bottom segment 1707 (i.e. position segment) for receiving one terminal 1711 of the electronic component 171. When the terminal 1711 of the electronic component 171 is pressed and guided toward the bottom segment 1707 of the receiving slot 1706, the terminal 1711 of the electronic component 171 can be positioned in the bottom segment 1707 of the receiving slot 1706 by punching the adjacent arm 1705 downwardly so as to clamp the terminal 1711 inside the bottom segment 1707 of the receiving slot 1706. Namely, the terminal 1711 of the electronic component 171 can be positioned in the bottom segment 1707 of the receiving slot 1706 by clamping method.

Figure 6A:
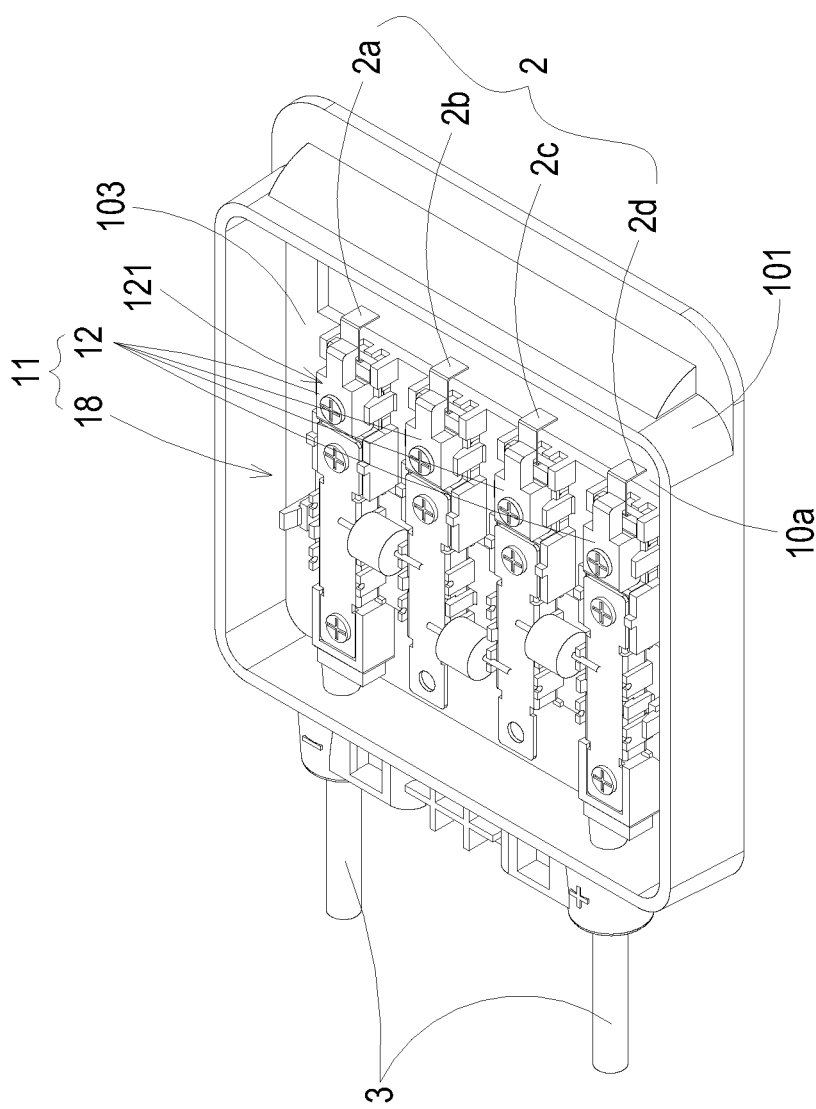
FIG. 6A is a schematic view showing another electrical connection mechanism of the junction box of FIG. 1.
Figure 6B:
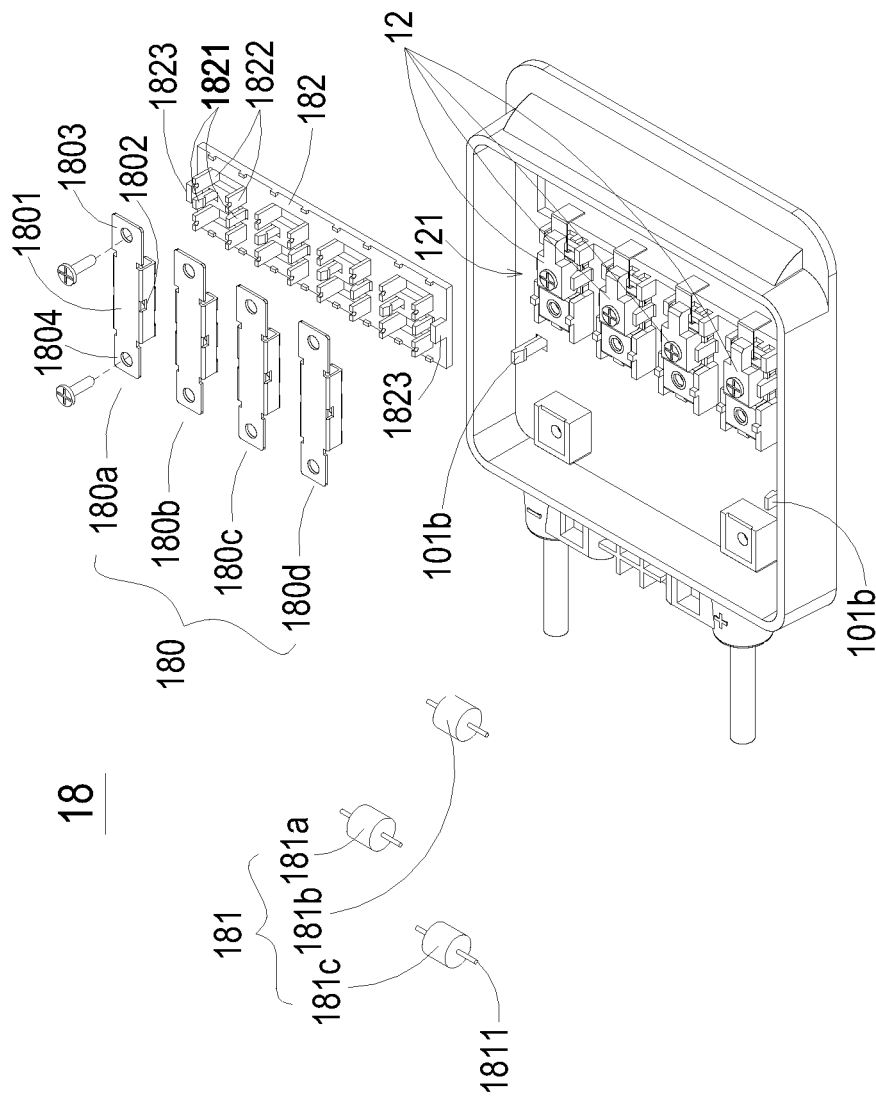
FIG. 6B is a schematic view showing the current-path arrangement module of the electrical connection mechanism of FIG. 6A.

FIG. 6A is a schematic view showing another electrical connection mechanism of the junction box of FIG. 1; and FIG. 6B is a schematic view showing the current-path arrangement module of the electrical connection mechanism of FIG. 6A. As shown in FIGS. 6A and 6B, the junction box 1 includes an electrical connection mechanism 11 disposed in a receptacle 103 of the base 101 and configured to connect with the conductor strips 2 of the solar modules through the opening 101a of the base 101 and two electrical cables 3. The electrical connection mechanism 11 includes a plurality of conductor strip connection devices 12 and a current-path arrangement module 18, which is detachably connected with the conductor strip connection devices 12 and the electrical cables 3. The conductor strip connection devices 12 are disposed and mounted on an inner surface of the base 101 and configured to contact and connect with the conductor strips 2 of the solar modules, for example four flat and thin conductor strips 2a, 2b, 2c, 2d. Each of the conductor strip connection devices 12 includes a terminal connection part 121 for structural and electrical connection to a corresponding conductor strip 2a-2d. Preferably, the conductor strip connection devices 12 are secured, fastened or attached to the bottom surface of the base 101 by engaging, screwing, embedding, insertion molding, locking or adhesive, and it is not limited thereto.

The current-path arrangement module 18 is detachably connected with the conductor strip connection devices 12 and the electrical cables 3 and includes a plurality of electricity conveying elements 180, a plurality of electronic components 181 and a carrier 182. The electricity conveying elements 180 are separately disposed on one surface of the carrier 182 to form a plurality of electricity conveying paths. The electronic components 181 are disposed on the carrier 182, and each electronic component 181 is connected to two adjacent electricity conveying elements 180 so as to form a current-path arrangement as required. In an embodiment, the carrier 182 is a supporting plate for supporting and mounting the electricity conveying elements 180 and the electronic components 181 thereon, the electricity conveying elements 180 are electrical conductive rails disposed on one surface of the carrier 182, and the electronic components 181 are bypass diodes. More preferably, there are four electrical conductive rails 180a, 180b, 180c, 180d and three bypass diodes 181a, 181b, 181c mounted on one surface of the carrier 182. In an embodiment, each bypass diode 181a, 181b, 181c has two terminals connected to two adjacent electrical conductive rails 180a, 180b, 180c, 180d of the current-path arrangement module 18. The electrical conductive rails 180a, 180b, 180c, 180d can be mounted on one surface of the carrier 182 by rails, embedding, engaging, locking or adhesive, and it is not limited thereto. The carrier 182 can be mounted on the bottom surface in the receptacle 103 of the base 101 of the housing 10 by screwing, locking or engaging, and it is not limited thereto. By using the current-path arrangement module 18, the bypass diodes 181a, 181b, 181c can be replaced and maintained easily by replacing the current-path arrangement module 18 with another one when one or more bypass diodes 181a, 181b, 181c is breakdown or failed.

In an embodiment, each of the electricity conveying elements 180 includes a main body 1801. The main body 1801 has at least one engaging element 1802. The carrier 182 has a plurality of engaging elements 1821 for engaging with the engaging elements 1802 of the electricity conveying elements 180. Preferably, the engaging elements 1821 of the carrier 182 are hooks and the engaging elements 1802 of the electricity conveying elements 180 are engaging holes, and it is not limited thereto. The carrier 182 includes a plurality of supporting elements 1822 for supporting and securing the terminals 1811 of the electronic components 181 so that the terminals 1811 of the electronic components 181 can be coupled to the electricity conveying elements 180. Preferably, the supporting elements 1822 are protrusion rods with clamping arms. The carrier 182 can be secured on the bottom surface of the receptacle 103 of the base 101. The carrier 182 further includes one or more securing element 1823 and the base 101 includes one or more securing element 101b for fastening with the securing element 1823 of the carrier 182 so that the carrier 182 can be secured on the bottom surface of the receptacle 103 of the base 101. The main body 1801 of the electricity conveying element 180 further includes a first connection pad 1803 and a second connection pad 1804. The first connection pad 1803 of the electricity conveying element 180 is connected and fastened with the terminal connection part 121 by fastening element, for example screw or clamping devices made of resilient and conductive material, and it is not limited thereto. The second connection pad 1804 of the electricity conveying element 180 is connected and fastened with a corresponding electrical cable 3 by fastening element, for example screw or clamping devices made of resilient and conductive material, and it is not limited thereto.

Figure 7A:
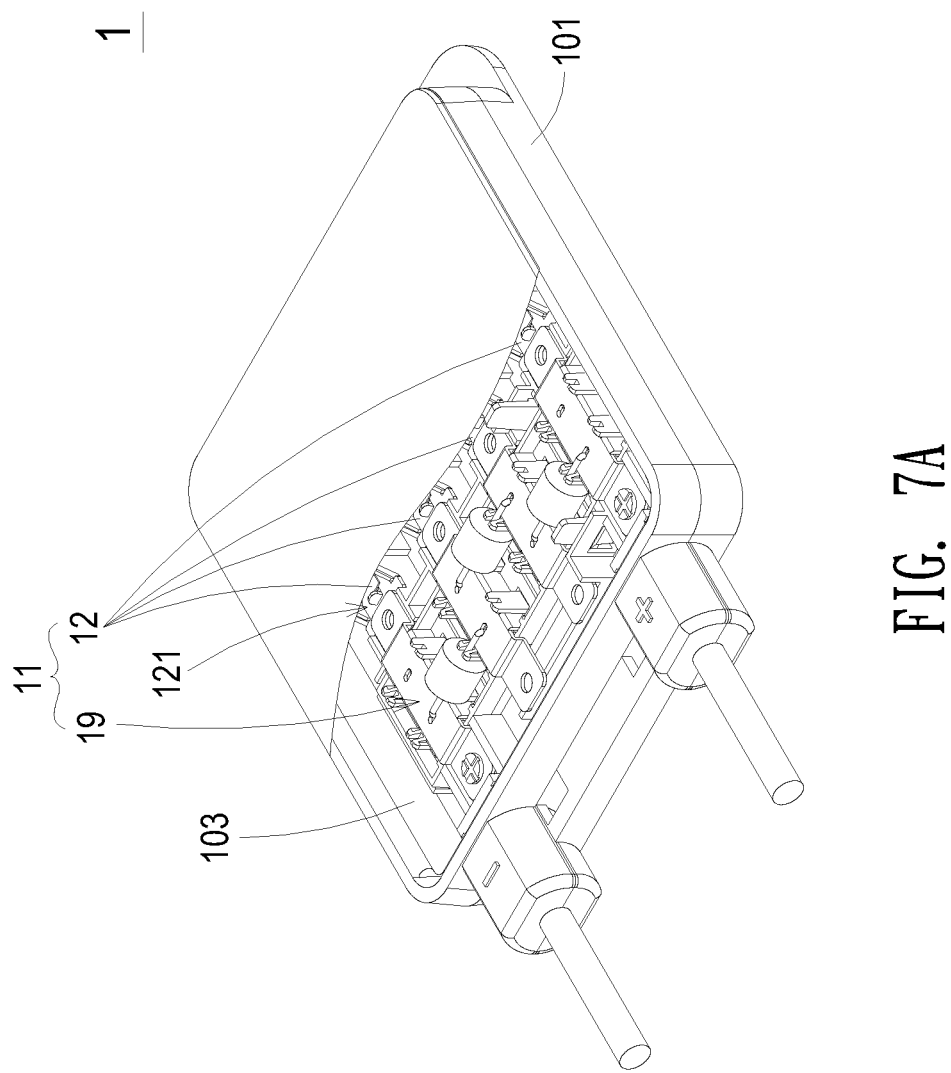
FIG. 7A is a schematic view showing another electrical connection mechanism of the junction box of FIG. 1.
Figure 7B:
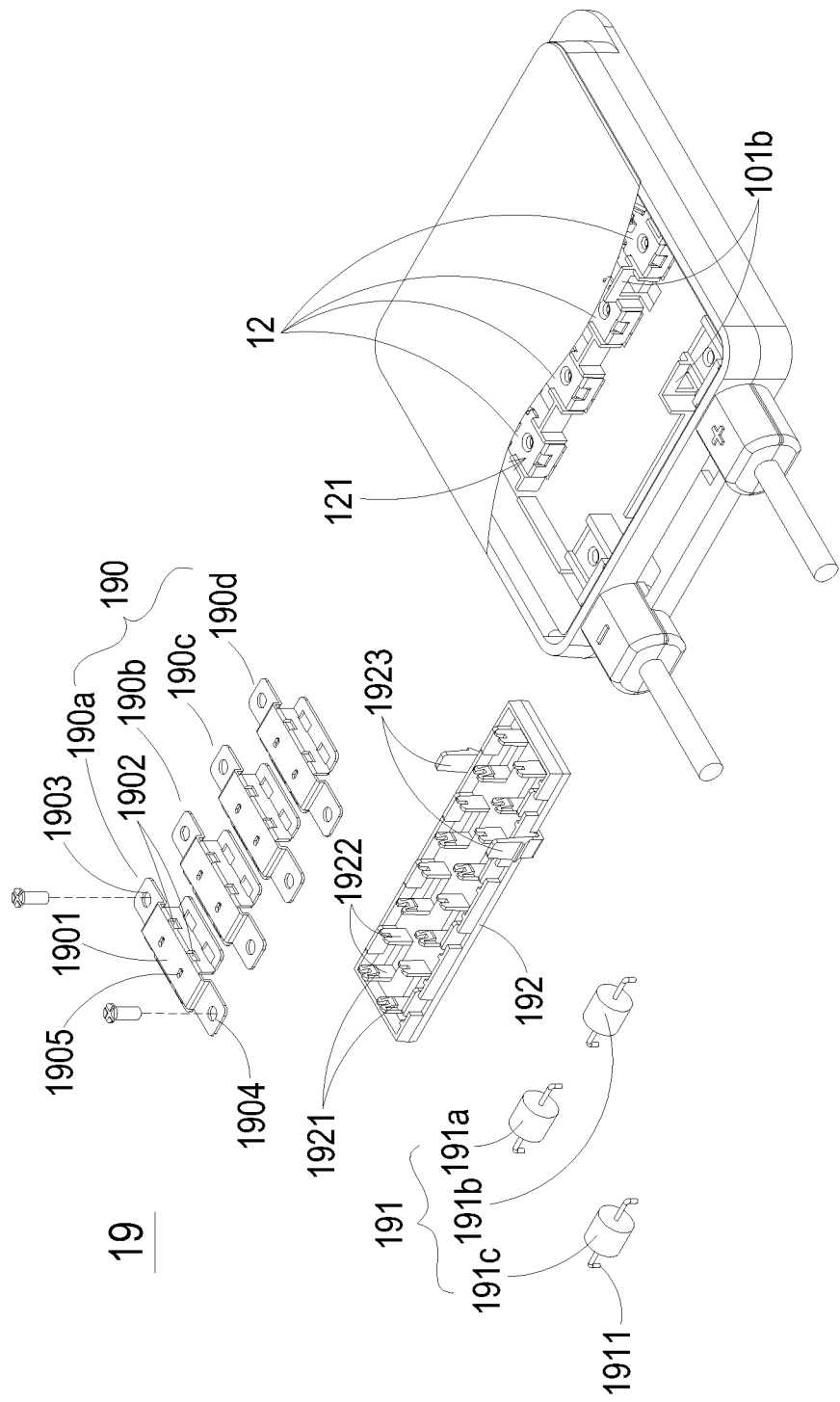
FIG. 7B is a schematic view showing the current-path arrangement module of the electrical connection mechanism of FIG. 7A.

FIG. 7A is a schematic view showing another electrical connection mechanism of the junction box of FIG. 1; and FIG. 7B is a schematic view showing the current-path arrangement module of the electrical connection mechanism of FIG. 7A. As shown in FIGS. 7A and 7B, the junction box 1 includes an electrical connection mechanism 11 disposed in a receptacle 103 of the base 101 and configured to connect with the conductor strips of the solar modules through the opening of the base 101 and two electrical cables 3. The electrical connection mechanism 11 includes a plurality of conductor strip connection devices 12 and a current-path arrangement module 19, which is detachably connected with the conductor strip connection devices 12 and the electrical cables 3. The conductor strip connection devices 12 are disposed and mounted on an inner surface of the base 101 and configured to contact and connect with the conductor strips of the solar modules. Each of the conductor strip connection devices 12 includes a terminal connection part 121 for structural and electrical connection to a corresponding conductor strip. Preferably, the conductor strip connection devices 12 are secured, fastened or attached to the bottom surface of the base 101 by engaging, screwing, embedding, insertion molding, locking or adhesive, and it is not limited thereto.

The current-path arrangement module 19 is detachably connected with the conductor strip connection devices 12 and the electrical cables 3 and includes a plurality of electricity conveying elements 190, a plurality of electronic components 191 and a carrier 192. The electricity conveying elements 190 are separately disposed on one surface of the carrier 192 to form a plurality of electricity conveying paths. The electronic components 191 are disposed on the carrier 192, and each electronic component 191 is connected and secured to two adjacent electricity conveying elements 190 so as to form a current-path arrangement as required. In an embodiment, the carrier 192 is a supporting plate for supporting and mounting the electricity conveying elements 190 and the electronic components 191 thereon, the electricity conveying elements 190 are electrical conductive rails disposed on one surface of the carrier 192, and the electronic components 191 are bypass diodes. More preferably, there are four electrical conductive rails 190a, 190b, 190c, 190d and three bypass diodes 191a, 191b, 191c mounted on one surface of the carrier 192. In an embodiment, each bypass diode 191a, 191b, 191c has two terminals connected to two adjacent electrical conductive rails 190a, 190b, 190c, 190d of the current-path arrangement module 19. The electrical conductive rails 190a, 190b, 190c, 190d can be mounted on one surface of the carrier 192 by rails, embedding, engaging, locking or adhesive, and it is not limited thereto. The carrier 192 can be mounted on the bottom surface in the receptacle 103 of the base 101 of the housing 10 by screwing, locking or engaging, and it is not limited thereto. By using the current-path arrangement module 19, the bypass diodes 191a, 191b, 191c can be replaced and maintained easily by replacing the current-path arrangement module 19 with another one when one or more bypass diodes 191a, 191b, 191c is breakdown or failed.

In an embodiment, each of the electricity conveying elements 190 includes a main body 1901. The main body 1901 has plural engaging elements 1902. The carrier 192 has plural engaging elements 1921 for engaging with the engaging elements 1902 of the electricity conveying elements 190. Preferably, the engaging elements 1921 of the carrier 192 are hooks and the engaging elements 1902 of the electricity conveying elements 190 are engaging holes, and it is not limited thereto. The carrier 192 includes a plurality of supporting elements 1922 for supporting and securing the terminals of the electronic components 191 so that the terminals of the electronic components 191 can be coupled to the electricity conveying elements 190. Preferably, the supporting elements 1922 are protrusion rods with clamping arms. More preferably, the supporting element 1922 and the engaging element 1921 are integrally formed. When the terminals 1911 of the electronic components 191 are coupled to the electricity conveying elements 190, the terminals 1911 of the electronic components 191 can be inserted into the through holes 1905 formed on the main bodies 1901 of the electricity conveying elements 190.

The carrier 192 can be secured on the bottom surface of the receptacle 103 of the base 101. The carrier 192 further includes one or more securing element 1923 and the base 101 includes one or more securing element 101b for fastening with the securing element 1923 of the carrier 192 so that the carrier 192 can be secured on the bottom surface of the receptacle 103 of the base 101. The main body 1901 of the electricity conveying element 190 further includes a first connection pad 1903 and a second connection pad 1904. The first connection pad 1903 of the electricity conveying element 190 is connected and fastened with the terminal connection part 121 by fastening element, for example screw or clamping devices made of resilient and conductive material, and it is not limited thereto. The second connection pad 1904 of the electricity conveying element 190 is connected and fastened with a corresponding electrical cable 3 by fastening element, for example screw or clamping devices made of resilient and conductive material, and it is not limited thereto.

To sum up, the junction box of the present application is simple in construction, cost-effective, durable enough to withstand a wide range of environment conditions and easily be assembled, installed and maintained. In addition, the junction box of the present application includes an electrical connection mechanism with a current-path arrangement module capable of assembling, fastening and replacing the bypass diodes easily. Moreover, the junction box of the present invention can maintain a high-quality, reliable electrical connections between the components of a solar or photovoltaic system.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A junction box, comprising:
a housing having an opening for introducing a plurality of conductor strips thereinto; and
an electrical connection mechanism disposed in a receptacle of said housing and comprising:
a plurality of conductor strip connection devices disposed on an inner surface of said housing for connecting to said conductor strips; and
a current-path arrangement module detachably connected with said conductor strip connection devices and comprising a carrier, a plurality of electricity conveying elements and a plurality of electronic components, wherein said electricity conveying elements and said electronic components are disposed on one surface of said carrier, and each said electronic component is connected with two adjacent electricity conveying elements.

2. The junction box according to the claim 1, wherein said electronic components are bypass diodes.

3. The junction box according to the claim 1, wherein said electricity conveying elements are separately disposed on said surface of said carrier to form a plurality of electricity conveying paths, and each said electronic component is connected to two adjacent electricity conveying elements so as to form a current-path arrangement.

4. The junction box according to the claim 1, wherein said carrier is a printed circuit board or a wiring board, and said electricity conveying elements are electrical conductive traces disposed on said surface of said carrier.

5. The junction box according to the claim 4, wherein said electricity conveying element comprises:
a first connection pad disposed on a first side edge of said carrier for connecting to a corresponding conductor strip connection device; and
a second connection pad disposed on a second side edge of said carrier opposite to said first side edge for connecting to a contact portion of an electrical cable.

6. The junction box according to the claim 1, wherein said carrier is a supporting plate for supporting and mounting said electricity conveying elements and said electronic components thereon, and said electricity conveying elements are electrical conductive rails disposed on said surface of said carrier.

7. The junction box according to the claim 6, wherein each said electronic component has two terminals connected and fastened to two adjacent electrical conductive rails of said current-path arrangement module.

8. The junction box according to the claim 1, wherein said electricity conveying elements are mounted on said surface of said carrier by rails, embedding, engaging, locking or adhesive.

9. The junction box according to the claim 1, wherein said carrier is mounted on a bottom surface of a base of said housing by screwing, locking or engaging.

10. The junction box according to the claim 1, wherein each of said electricity conveying elements comprises:
a main body having an engaging element, a first sidewall and a second sidewall, each of said first sidewall and said second sidewall having at least one sliding slot, wherein said sliding slot includes plural guiding segments, a curve segment and a bottom segment; and
a resilient member having two arms, a connection portion and at least one engaging element, wherein said engaging element is extended outwardly from said connection portion and secured to said engaging element in an inner surface of said main body so that said resilient member is disposed in an interior of said main body and said two arms are disposed adjacent to said sliding slots of said main body.

11. The junction box according to the claim 10, wherein one terminal of said electronic component is pressed and guided toward said bottom segment of said sliding slot and goes across said curve segment so that said terminal of said electronic component is positioned in said bottom segment of said sliding slot by said resilient member.

12. The junction box according to the claim 10, wherein said main body of said electricity conveying element further includes a first connection pad and a second connection pad for connecting to a corresponding conductor strip connection device and a corresponding electrical cable, respectively.

13. The junction box according to the claim 1, wherein each of said electricity conveying elements includes a main body having at least one engaging element, and said carrier has a plurality of engaging elements for engaging with said engaging elements of said electricity conveying elements.

14. The junction box according to the claim 13, wherein said engaging elements of said carrier are hooks, and said engaging elements of said electricity conveying elements are engaging slots.

15. The junction box according to the claim 1, wherein said carrier further comprises one or more securing element, and a base of said housing includes one or more securing element for fastening with said securing element of said carrier.

16. The junction box according to the claim 1, wherein said carrier includes a plurality of supporting elements for supporting and securing a plurality of terminals of said electronic components so that said terminals of said electronic components are coupled to said electricity conveying elements.

17. The junction box according to the claim 1, wherein said supporting elements are protrusion rods with clamping arms.

18. The junction box according to the claim 1, wherein each of said conductor strip connection devices includes a terminal connection part for structurally and electrically connecting to a corresponding conductor strip.

19. An electrical connection mechanism for a junction box of a solar module, comprising:
a plurality of conductor strip connection devices for structurally and electrically connecting to a plurality of conductor strips of said solar module; and
a current-path arrangement module detachably connected with said conductor strip connection devices and comprising a carrier, a plurality of electricity conveying elements and a plurality of electronic components, wherein said electricity conveying elements and said electronic components are disposed on one surface of said carrier, said electricity conveying elements are connected with said conductor strip connection devices respectively, and said electronic components are connected with said electricity conveying elements.

20. The electrical connection mechanism according to the claim 19, wherein said electronic components are bypass diodes.

* * * * *